United States Patent [19]

Kato et al.

[11] Patent Number: 5,301,214
[45] Date of Patent: Apr. 5, 1994

[54] ASSEMBLING APPARATUS FOR NUCLEAR FUEL ASSEMBLY

[75] Inventors: Akihiro Kato; Masashi Yoshida; Katsunori Ohuchi, all of Ibaraki, Japan

[73] Assignee: Mitsubishi Nuclear Fuel Co., Tokyo, Japan

[21] Appl. No.: 962,105

[22] Filed: Oct. 16, 1992

[30] Foreign Application Priority Data

Oct. 24, 1991 [JP] Japan .................................. 3-278097
Aug. 28, 1992 [JP] Japan .................................. 4-230591

[51] Int. Cl.$^5$ .............................................. G21C 19/00
[52] U.S. Cl. ...................................... 376/261; 376/269
[58] Field of Search ............... 376/261, 269, 271, 260; 29/711, 742; 976/DIG. 68, DIG. 252

[56] References Cited

U.S. PATENT DOCUMENTS 4,558,982 12/1985 Oakley et al. .
4,625,396 12/1986 Ahmed et al. .
4,649,632 3/1987 Schoenig, Jr. et al. ................ 29/701
4,687,245 8/1987 Formanek .......................... 294/87.1
4,747,997 3/1988 Boatwright ........................ 376/261
5,068,081 11/1991 Oyama et al. .

FOREIGN PATENT DOCUMENTS 0138711 4/1985 European Pat. Off. .
0223200 5/1987 European Pat. Off. .

Primary Examiner—Donald P. Walsh
Assistant Examiner—Meena Chelliah
Attorney, Agent, or Firm—Oblon, Spivak, McClelland, Maier & Neustadt

[57] ABSTRACT

The present invention relates to a pull-in rod type loader for loading fuel rods efficiently and conveniently from a fuel rod magazine to a fuel assembly. The control rod pipes and fuel rods are held in assigned grid cells, respectively termed pipe-cells and fuel-rod-cells, in each quadrant section of a grid. The control rod pipes are disposed in a quadrant so that the locations of the pipe-cells assigned for the guide pipes in one quadrant are symmetrical with respect to a central rotational axis of the apparatus. The grid cells and the pull-in loader are both aligned with respect to a central rotational axis. To load the fuel rods into the fuel assembly, only the pull-in rods need to be operated for every 90 degree rotation of the loader about the central axis, because the locations of the pull-in rods correspond exactly with the grid cells assigned to hold fuel rods. This type of loader does not require complex switching devices required in the conventional pull-in rod type of loaders, and the assembling operation can be carried out efficiently and quickly.

3 Claims, 4 Drawing Sheets

ASSEMBLING APPARATUS FOR NUCLEAR FUEL ASSEMBLY

BACKGROUND OF THE INVENTION

1. Field of the Invention

This invention relates to an apparatus for loading fuel rods into a fuel assembly for use in a nuclear reactor, such as a pressurized water reactor or the like.

2. Technical Background of the Invention

A conventional fuel assembly such as the one disclosed in U.S. Pat. No. 5,068,081, shown in FIG. 10, is known.

In this figure, the numerals 1 and 2 refer to top and bottom nozzles, respectively, which are disposed vertically and oppositely spaced apart, and have a plurality of rigidly fixed control-rod guide pipes 3 (hereinbelow referred to as guide pipes 3 between the top nozzle 1 and the bottom nozzle 2. In the mid section of the guide pipes 3 are a plurality of grids 4 disposed vertically and spaced apart from each other.

The grids 4 are constructed of a plurality of straps 7 made of thin metal strips having slits 8 formed in the longitudinal direction, as shown in FIG. 4. The slits 8 are interlocked to form a latticed structure as shown in FIG. 5, and each space bounded by the straps is known as a grid cell 5. Each grid cell 5 is provided with dimples 9 and springs 10 formed on the opposing walls of the grid cells 5. A fuel rod 6 inserted into a grid cell 5, shown in FIG. 6, is pressed against the dimple 9 by the spring 10, thereby holding the fuel rod 6 firmly in the grid cell 5.

There are different approaches to the steps involved in assembling such an assembly. For example, in the first method, as shown in FIG. 1, the grids 4 are disposed at a predetermined spacing, and the guide pipes 3 and an instrumentation tube is inserted into and fixed to designated grid cells 5 of each of the grids 4, respectively, followed by insertion of the fuel rods 6 into the other grids cells 5 of each of the grids 4 which are supported by the guide pipes 3. In the second method, the fuel rods 6 and inserted into and firmly held in the grid cells 5 first, followed by insertion of the control-rod guide pipes 3 and an instrumentation tube into the other grid cells 5 of the grids 4, followed by a step of rigidly fixing the guide pipes 3 to the grids. A method of inserting fuel rods 6 in grid cells 5 with the use of a pull-in loader is known, for example, in Japanese Patent Application, Laid open publication, H2-181,699, which involves the use of key means to deactivate the springs 10, followed by extending the pull-in rods of a pull-in device through the grids 5, gripping the tips of the fuel rods 6 housed in a fuel rod magazine with the gripping device attached to the pull-in rods, and loading the fuel assembly with fuel rods 6 by pulling the fuel rods 6 into the grid cells 5 of the grids 4.

There are problems in loading the fuel rods 6 with the use of pull-in rods after the guide pipes 3 (and an instrumentation tube) are fixed to the grids 4. One of the problems is the mechanical interference which occurs between the pull-in rods and the installed guide pipes 3 when trying to load the fuel rods 6 into the grids 4. The mechanical interference is due to the fact that certain grid cells 5 are already occupied by the cylindrical insert parts of the guide pipes 3 disposed at the entrance of the grids. In such a system, those pull-in rods corresponding with the grid cells 5 occupied by the guide pipes 3 must not be activated, and only those pull-in rods which correspond with the fuel rods 6 to be pulled into the grid cells 5 should be activated. The result is that the loading mechanism becomes complex because of the need for a special control device to select the correct pull-in rods. Furthermore, because the arrangement of the guide pipes in the grids are different for each tier of grid cells, the operation of the pull-in rods must be adjusted for each tier of grid cells, leading to a lengthy and cumbersome fuel rod installation operation.

SUMMARY OF THE PRESENT INVENTION

The present invention Was made in view of the problems in the conventional fuel rod loading devices of the pull-in rod type, and an objective of the invention is to present a loading apparatus of the pull-in rod type having a simple mechanical construction and operates efficiently and quickly to load the fuel rods into the fuel assembly, without the necessity for having a special selection device.

The assembling apparatus of the present invention comprises, from the fuel rod entry-side of the assembling apparatus:

(a) a fuel rod magazine aligned about a central axis and disposed on the entry-side end of the apparatus, for housing fuel rods extending longitudinally in parallel alignment;

(b) support frames aligned about the central axis, for supporting the grids so that the grid cells face in the direction of longitudinally extending fuel rods; and (c) a pull-in loader for loading fuel rods, aligned about the central axis and freely rotatably disposed on the exit-side end of the apparatus opposite to the fuel rod magazine, the pull-in loader having:

a plurality of pull-in rods provided with gripping means attached to the end thereof for gripping and loading the fuel rods in the fuel assembly, wherein (d) the pipe-cells, for inserting the control rod guide pipes, are situated in the lattice structure of the grid, so that the locations of pipe-cells in one quadrant of the grids correspond with the locations of pipe-cells in the remaining three quadrants when the one quadrant is rotated in steps of ninety degrees about the central axis of the grids; and (e) the pull-in loader is provided with:

a plurality of pull-in rods, of a length sufficient to reach the entry-side end of the fuel rods by translating longitudinally along the central axis, aligned and corresponded with the locations of the fuel-rod-cells for firmly holding the fuel rods therein.

According to the assembling apparatus of the present invention, it is possible to load one quarter of all the fuel rods required for the fuel assembly in one loading operation, simply by inserting the pull-in rods into the fuel rod magazine and after gripping the ends of the fuel rods, loading the fuel rods into the grid cells by retracting the pull-in rods back into the loader.

In the above sequence of steps, there is no need to select the pull-in rods to be activated, every time the loader is rotated 90 degrees about the central axis for loading, so as to avoid those grid cells which are occupied by the guide pipes because the pull-in rods are already disposed to correspond with those grid cells which are intended for the fuel rods.

After one quarter of the required rods are loaded into the fuel assembly, the pull-in loader is rotated through 90 degrees, and the loading sequence of the pull-in rods is repeated to load the fuel rods into the next quadrant of the grids. Repeating the above steps for the remaining two quadrants of the grid, all the fuel rods are loaded into the fuel assembly. Such a simplified loading operation is made possible by duplicating the assigned locations of the pipe-cells in one quadrant of a grid exactly for the remaining three quadrants, so that for every 90 degree rotation of the pull-in loader, the pull-in rods are arranged to correspond with the grid cells assigned for the fuel rods in the grid, thus inserting the fuel rods into only the grid cells assigned for the fuel rods. The invented loading apparatus thus simplifies the loading process by not requiring the use of a pull-in rod selector which is needed in the conventional pull-in rod type fuel rod loaders.

PREFERRED EMBODIMENT OF THE INVENTION

A first embodiment will be explained with reference to FIGS. 1 and 2. In the following explanation, the component sections which are common to the conventional fuel assembly are given the same reference numbers, and their explanations are omitted. In the following descriptions, the direction is referenced with respect to the travel direction of the fuel rods which travel longitudinally from the right to the left of the illustration in FIG. 1. Therefore, the right side of a component or an apparatus is referred to as the entry-side and the left side thereof as the exit-side.

Figure 1:
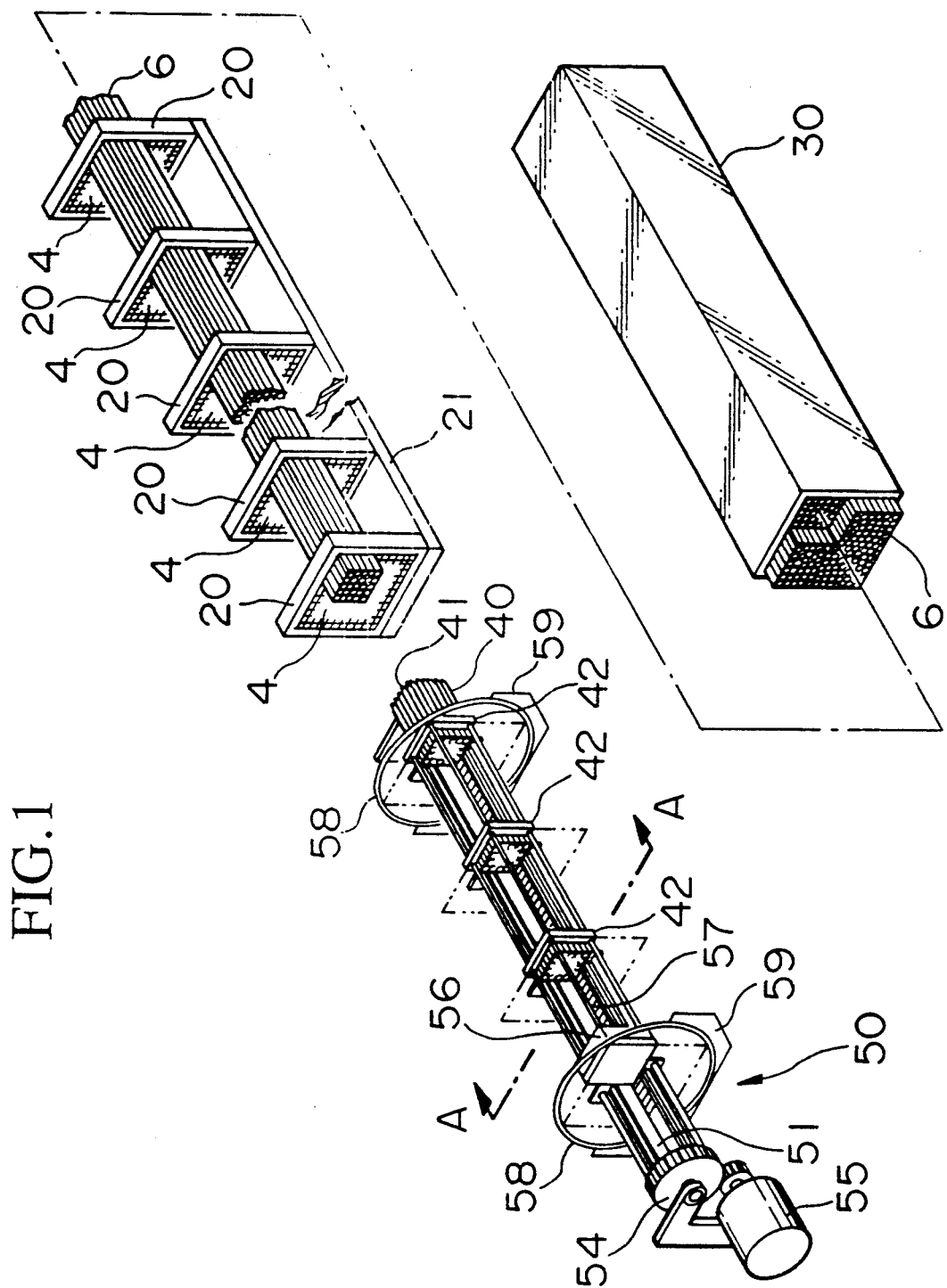
FIG. 1 is a schematic drawing of a first embodiment of the assembling apparatus of the present invention.

The assembling apparatus of the first embodiment comprises, from the fuel rod entry-side of the assembling apparatus:

(a) a fuel rod magazine 30, which houses a plurality of longitudinally extending parallel fuel rods 6, disposed at the entry-end of the assembling apparatus (right in FIG. 1);

(b) seven grid support frames 20 (termed support frames 20) which support the grids 4 so that the grid cells 5 face in the direction of the longitudinal fuel rods 6; and (c) a plurality of pull-in rods 40, housed in a pull-in loader 50, disposed on the exit-end of the apparatus with the support frames 20 in between, for gripping the tips of the fuel rods 6 at their exit-side (left end in FIG. 1).

Figure 5:
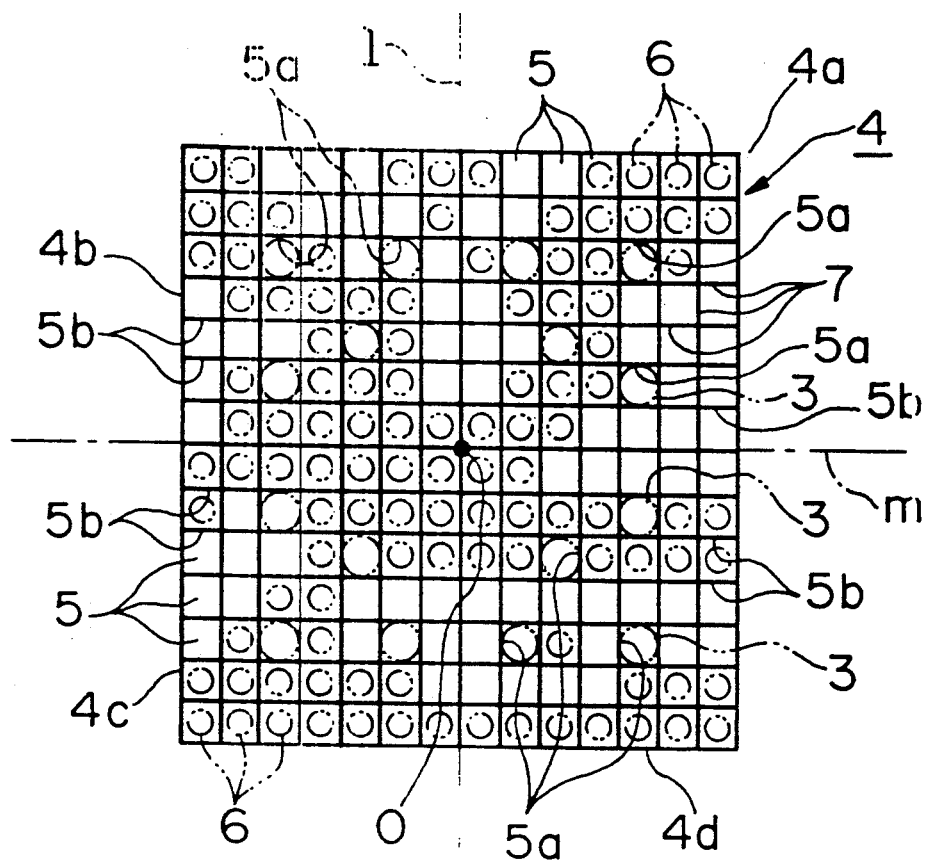
FIG. 5 is a cross sectional view of a fuel assembly containing a plurality of fuel rods and a plurality of guide pipes which hold the fuel assembly together.
Figure 6:
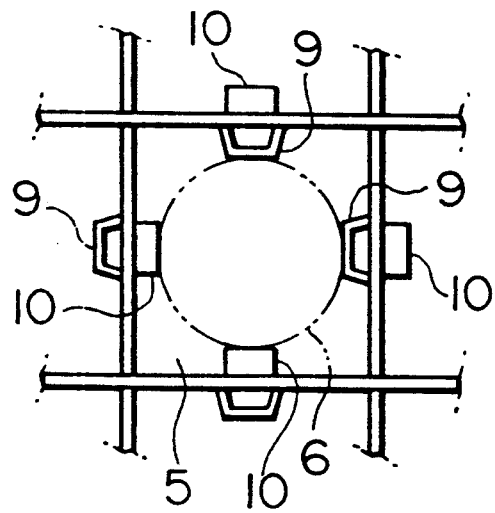
FIG. 6 is an enlarged partial view of a grid cell holding a fuel rod firmly therein.

Each of the grids 4 is divided, as shown in FIG. 5, into four square quadrants, 4a, 4b, 4c, and 4d, formed by the two orthogonal lines 1 and m which pass through the central axis O of the assembling apparatus coaxial with the central axis O of the grids 4. Four grid cells for guide pipes 5a (termed pipe-cells 5a, i.e. those grid cells 5 for inserting guide pipes 3) are distributed symmetrically in each of the quadrants in such a way that the locations of the pipe-cells 5a in one quadrant coincide exactly with all the other quadrants when any one quadrant is rotated in 90 degree steps about the central axis O. In other words, the pipe-cells 5a are disposed symmetrically about the central axis O. The pull-in rods 40 are positioned so that they correspond with the locations of the fuel rods 6 in the fuel rod magazine 30, and with the fuel-rod-cells 5b (i.e. those grid cells 5 which are assigned to hold fuel rods 6) in each of the four quadrants. In other words, the fuel rods 6 are placed in specific fuel-rod-cells 5b of the quadrant avoiding duplication with the pipe-cells 5a. The group of pull-in rods 40 disposed within one quadrant is rotatable as a unit about the central axis O by means of a rotating device disposed on the pull-in loader 50 which supports all the pull-in rods 40 as shown in FIG. 1. The length of the pull-in rods 40 is such that they can reach the fuel rods 6 housed in the fuel rod magazine 30 through the grid cells 5 by translating freely along the longitudinal direction via a longitudinal base 57.

The support frames 20 are disposed at a given spacing on a rotating base 21 which extends in the fuel rod direction. The rotating base 21 can be raised, by power means, to a vertical position when the fuel rod loading operation is completed.

The tips of the pull-in rods 40 (at the entry-end) are provided with a gripper 41 to grip the fuel rods 6, and are further provided with a number of holding plates 42 for maintaining the fuel rods in specific alignment.

Figure 2:
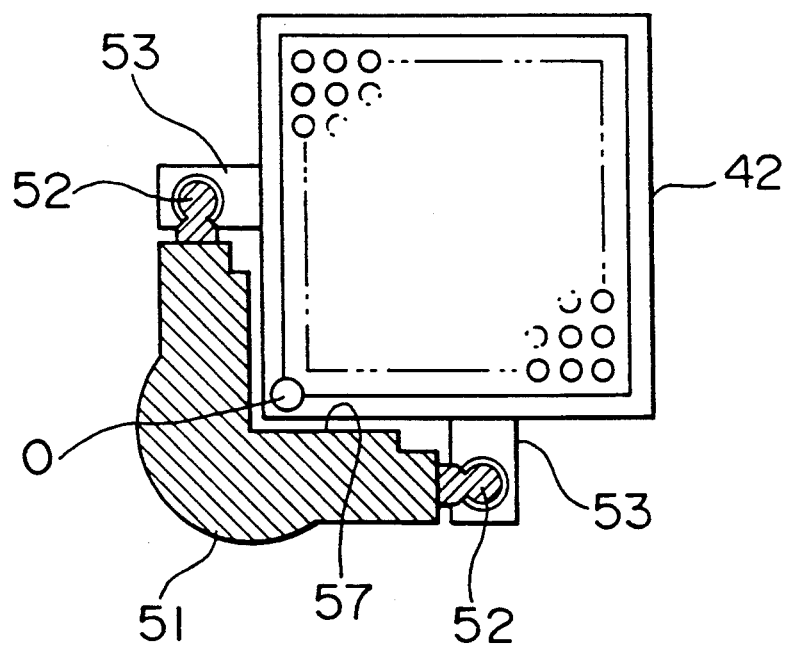
FIG. 2 is an enlarged cross sectional view of the section at a line A—A shown in FIG. 1.
Figure 3:
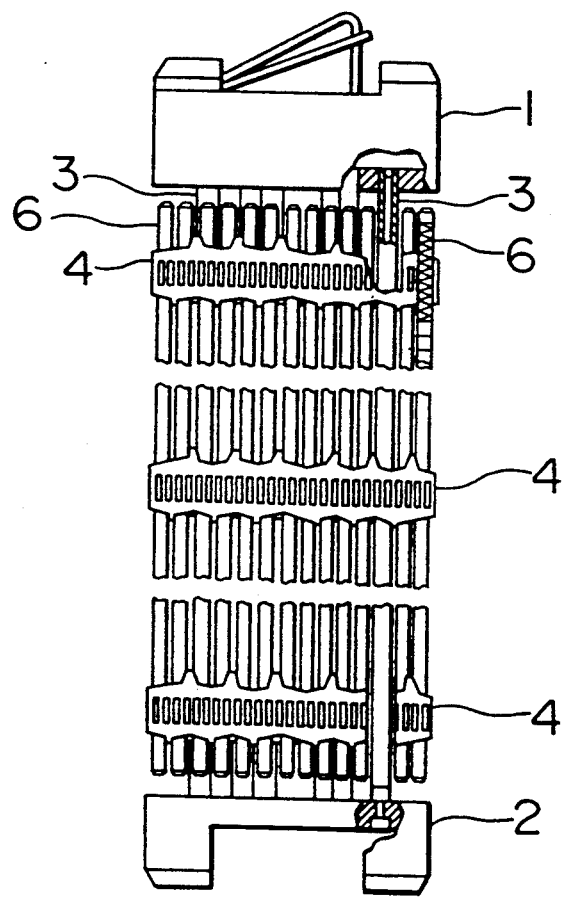
FIG. 3 is a side view of a conventional fuel assembly.
Figure 4:
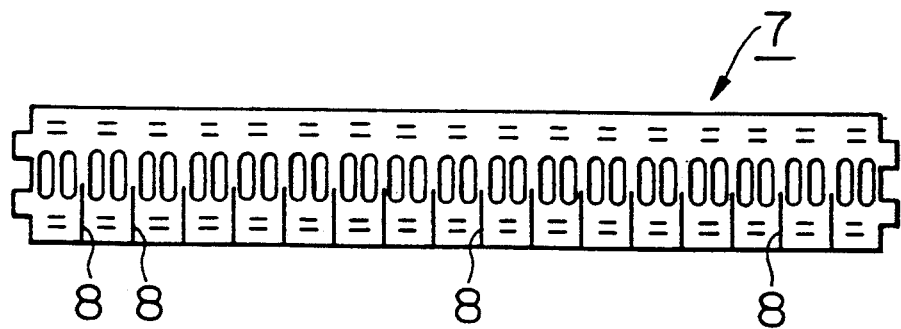
FIG. 4 is a front view of a strap used in forming the grid cells of the grids.

The pull-in loader 50 comprises:

(a) an extended L-shaped base 51, whose cross section is shown in FIG. 2, disposed in the longitudinal direction, which support the pull-in rods 40 via support plates 42;

(b) guide rails 52 disposed on both edge sections of the L-shaped extended base 51 extending in the longitudinal direction;

(c) guide parts 53 which protrude from the two side surfaces of the support plates 42 facing the extended base 51, and slidingly engages with the guide rails 52;

(d) a motor 55 which is disposed at the exit-end of the extended base 51 (left end in FIG. 1) for rotating the base 51 via gearing 54 about the central axis O coaxial with the central axis O of the grids 4;

(e) a transfer base 56, shown in FIG. 1, which is disposed near the exit-end of the pull-in rods 40, housing a linear motor which moves the entire pull-in rods 40 toward the grids 4;

(f) a longitudinal base 57 which extends on the extended base 51 longitudinally between the transfer base 56 and the extended base 51;

(g) a ring-shaped rotatable rail 58 which rotates in the peripheral direction, disposed near each end of the pull-in rods 40, for guiding the rotating motions of extended base 51 and the pull-in rods 40 rotating about the central axis O by means of the motor 55 and gearing 54;

(h) peripheral rotation guide (not shown), disposed between the rotatable rails 58 and both the longitudinal base 57 and the support plate 42, detachably attached to the longitudinal base 57 and the support plate 42 so as not to interfere with the movement of the pull-in rods 40 with the rotatable rails 58; and (i) rail supports 59 providing support to the rotatable rails 58.

The operation of the assembling apparatus of the embodiment will be explained in the following.

First, by operating the linear motor attached to the transfer base 56, the pull-in rods 40 are translated toward the grids 4 along the longitudinal base 57 (i.e. along the extended base 51), and after passing through the grid cells 5 of the grids 4 to reach the tip ends at the exit-side end of the fuel rods 6 housed in the fuel rod magazine 30. Then, the grippers 41 contact and grip the tip ends of the fuel rods 6.

The pull-in rods 40 are able to pass through the grid cells 5 of the grids 4 without any interference from any of the guide pipes 3, because all the pull-in rods 40 in a particular quadrant correspond with the assigned fuel-rod-cells 5b for the fuel rods 6 disposed within the particular quadrant of the grids 4.

Next, the linear motor is again operated to retract the pull-in rods 40 so as to pull the fuel rods 6 gripped by the pull-in rods 40 into the fuel-rod cells 5b of the grids 4. Thus, it is possible to load a quarter of all the fuel rods 6 in one operation simply by retracting the pull-in rods 40.

After the fuel rods 6 are positioned properly in the fuel-rod cells 5b of the grids 4, the grippers 41 release the fuel rods 6, and the pull-in rods 40 are retracted slightly toward the exit-side to return them to their original position. Then, by means of the motor 55 of the pull-in loader 50 (via the gear 54, the extended base 51 and the support plate 42), the pull-in rods 40 are rotated about the central axis O (refer to FIG. 1) through 90 degrees. By this procedure, the pull-in rods 40 in the nearest neighbor quadrant are made to move to the loading locations (refer to FIG. 5) so as to enable loading of the fuel rods 6 disposed in the quadrant of the fuel rod magazine 30 into the corresponding quadrant of the grids 4 of the fuel assembly.

In the present embodiment, the grid cells 5 of the grids 4 are divided into four quadrants, 4a, 4b, 4c and 4d, and the grid cells 5 in each quadrant are assigned in such a way that, when the pull-in rods 40 are rotated through a 90 degree angle, the locations of the pipe-cells 5a in one quadrant always correspond with the pipe cell 5a in the next quadrant. Because of this arrangement, when the pull-in rods 40 in a quadrant are rotated through 90 degrees for loading, the locations of the pull-in rods 40 always correspond with the fuel-rod-cells 5b, thus enabling the pull-in rods 40 to avoid aligning with the pipe-cells 5a.

The pull-in rods 40 can then be operated to load the fuel rods 6 in the next quadrant into the fuel-rod-cells 5b of the grids 4.

By repeating the above process steps for other quadrants, all the fuel rods 6 in the fuel rod magazine 30 can be loaded into the grids 4 of a fuel assembly.

According to the present embodiment, only two main operational steps, pulling-in of the fuel rods 6 by the pull-in rods 40 and rotating of the pull-in rods 40, are required to load all the fuel rods 6 into the fuel assembly. The assembling apparatus is simplified because the loading apparatus does not depend on such complex device as a pull-in rod selector. The assembling operation is carried out quickly and efficiently because all the fuel rods 6 are loaded into the fuel assembly in four rotation steps, enabling to shorten the assembling time.

It should be noted that the present invention is not limited by the particular embodiment presented, and other variations of the invention are possible within the limitations disclosed in the following claims.

What is claimed is:

1. An assembling apparatus for a fuel assembly comprising a plurality of grids of a latticed structure, aligned about a central axis of said apparatus and containing a plurality of grid cells into which fuel rods and control rod guide pipes are inserted, wherein said plurality of grid cells consist essentially of:
   a plurality of pipe-cells disposed in predetermined locations in said grids for inserting control rod pipes passing through said grids;
   a plurality of fuel-rod-cells disposed in the remaining locations of said grids for holding a plurality of fuel rods passing through said grids;
   said apparatus comprising, in the order from an entry-side end of said apparatus;
   (a) a fuel rod magazine aligned about said central axis and situated at said entry-side end, for housing said fuel rods extending longitudinally in parallel alignment;
   (b) support frames aligned about said central axis, for supporting said grids so that said grid cells face in the direction of longitudinally extending fuel rods; and
   (c) a pull-in loader for loading fuel rods, aligned about said central axis and freely rotatably disposed on an exit-side end of said apparatus opposite to said fuel rod magazine, said pull-in loader having:
   a plurality of pull-in rods provided with gripping means attached to the tip end thereof for gripping and loading said fuel rods in said fuel assembly, wherein:
   (d) said pipe-cells are situated in said lattice structure so that the locations of said grid cells assigned to pipe-cells in one quadrant of said grids are identical with the locations of pipe-cells in the remaining three quadrants when said one quadrant is rotated in steps of ninety degrees about said central axis of said grids; and
   (e) said pull-in loader is provided with:
   a plurality of pull-in rods, of a sufficient length to reach the exit-side of said fuel rods by translating longitudinally toward said fuel rod magazine along said central axis, wherein said pull-in rods are aligned and corresponded with the locations of said fuel-rod cells;
   (f) said pull-in loader comprising:
   (f1) an extended base which supports the pull-in rods in the direction of a longitudinal direction of the fuel rods; and
   (f2) a driving means for rotating said extended base to orbit around said central axis.

2. An apparatus for assembly a fuel assembly as claimed in claim 1, wherein said support frames are disposed on a top surface of a rotating base extending longitudinally in the fuel rod direction, wherein said rotating base rotates said top surface of said rotating base reversibly from a horizontal position to a vertical position.

3. An apparatus for assembling a fuel assembly as claimed in claim 1, wherein said pull-in loader further comprises a transfer base adapted to transfer along said extended base in said longitudinal direction.

* * * * *